United States Patent
Terlizzi

(10) Patent No.: US 10,225,716 B2
(45) Date of Patent: Mar. 5, 2019

(54) WIRELESSLY CHARGED ELECTRONIC DEVICE WITH SHARED INDUCTOR CIRCUITRY

(71) Applicant: Apple Inc., Cupertino, CA (US)

(72) Inventor: Jeffrey J. Terlizzi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 157 days.

(21) Appl. No.: 15/054,616

(22) Filed: Feb. 26, 2016

(65) Prior Publication Data

US 2016/0254843 A1   Sep. 1, 2016

Related U.S. Application Data

(63) Continuation of application No. 13/776,436, filed on Feb. 25, 2013, now Pat. No. 9,276,639.

(51) Int. Cl.

| | |
|---|---|
| H02J 7/02 | (2016.01) |
| H04B 5/00 | (2006.01) |
| H04W 4/80 | (2018.01) |
| H01F 38/14 | (2006.01) |
| H02J 50/10 | (2016.01) |

(Continued)

(52) U.S. Cl.
CPC .............. *H04W 4/80* (2018.02); *H01F 38/14* (2013.01); *H02J 7/025* (2013.01); *H02J 17/00* (2013.01); *H02J 50/10* (2016.02); *H02J 50/12* (2016.02); *H02J 50/20* (2016.02); *H04B 1/385* (2013.01); *H04B 5/0006* (2013.01); *H04B 5/0031* (2013.01); *H04B 5/0037* (2013.01); *H01F 2038/143* (2013.01); *H04R 25/602* (2013.01);

(Continued)

(58) Field of Classification Search
CPC ... H04R 25/602; H04R 2225/31; H02J 7/025; A61C 17/224; H01F 38/13; H01F 2038/143; H01F 38/14; H01H 50/76; H01H 50/78
USPC ........ 381/315, 323, 383, 384; 320/108, 115; 600/25, 559; 607/56–57; 455/573; 307/104; 318/114

See application file for complete search history.

(56) References Cited

U.S. PATENT DOCUMENTS 7,546,040 B2   6/2009   Lee et al.
8,805,456 B1   8/2014   Hardy et al.
(Continued)

FOREIGN PATENT DOCUMENTS

EP   1220222   3/2002

*Primary Examiner* — Jesse A Elbin
(74) *Attorney, Agent, or Firm* — Teryz Law Group, P.C.; G. Victor Treyz; David K. Cole

(57) ABSTRACT

An electronic device may contain an input-output device such as a speaker, vibrator, or near field communications antenna. The input-output device may include an inductor. The inductor in the input-output device may be shared by wireless charging circuitry in the electronic device so that wireless charging signals can be converted into power to charge a battery in the electronic device. A separate inductor may also be provided within an input-output device to support wireless charging. A drive circuit may supply drive signals to the input-output device such as audio signals, vibrator control signals, or near field communications output signals for external near field communications equipment. An input amplifier that is coupled across the inductor in the input-output device may be used in receiving near field communications signals.

21 Claims, 8 Drawing Sheets

(51) Int. Cl.
  *H04R 25/00* (2006.01)
  *H04W 12/06* (2009.01)
  *H04W 12/08* (2009.01)
  *H04W 84/12* (2009.01)
  *H04B 1/3827* (2015.01)
  *H02J 50/12* (2016.01)
  *H02J 17/00* (2006.01)
  *H02J 50/20* (2016.01)

(52) U.S. Cl.
  CPC ............ *H04W 12/06* (2013.01); *H04W 12/08* (2013.01); *H04W 84/12* (2013.01)

(56) References Cited

U.S. PATENT DOCUMENTS

| | | |
|---|---|---|
| 9,118,354 B2 | 8/2015 | Kole et al. |
| 2002/0033681 A1 | 3/2002 | Kobayashi et al. |
| 2006/0052055 A1 | 3/2006 | Rowse et al. |
| 2006/0113932 A1 | 6/2006 | Mori et al. |
| 2008/0205678 A1 | 8/2008 | Boguslayskij et al. |
| 2008/0272889 A1 | 11/2008 | Symons |
| 2009/0052721 A1 | 2/2009 | Dabrowski |
| 2010/0156676 A1* | 6/2010 | Mooring ................ G06F 1/163 341/20 |
| 2010/0257382 A1 | 10/2010 | Azancot et al. |
| 2011/0065385 A1 | 3/2011 | Geslin et al. |
| 2011/0127954 A1 | 6/2011 | Walley et al. |
| 2011/0169657 A1 | 7/2011 | August et al. |
| 2011/0188677 A1 | 8/2011 | Rothkopf et al. |
| 2011/0304567 A1* | 12/2011 | Yamamoto ........... G06F 3/0416 345/173 |
| 2011/0319018 A1 | 12/2011 | Kroman |
| 2011/0319024 A1* | 12/2011 | Fish .................... H04B 5/0006 381/388 |
| 2012/0007549 A1 | 1/2012 | Murayama et al. |
| 2012/0150259 A1 | 6/2012 | Meskens |
| 2013/0005252 A1 | 1/2013 | Lee et al. |
| 2013/0101149 A1 | 4/2013 | Maenpaa |

* cited by examiner

WIRELESSLY CHARGED ELECTRONIC DEVICE WITH SHARED INDUCTOR CIRCUITRY

This application is a continuation of U.S. patent application Ser. No. 13/776,436, filed Feb. 25, 2013, which is hereby incorporated by reference herein in its entirety. This application claims the benefit of and claims priority to U.S. patent application Ser. No. 13/776,436, filed Feb. 25, 2013.

BACKGROUND

This relates generally to electronic devices and, more particularly, to electronic devices with wireless charging circuitry.

Electronic devices often include batteries. A battery in an electronic device can often be charged by using a cable to couple the electronic device to a source of power. It is not always convenient to rely on wired charging arrangements such as these. In compact and portable devices, for example, the use of a charging cable may be unwieldy. Charging cables can be avoided by using wireless charging, but wireless charging circuitry can be bulky.

It would therefore be desirable to be able to provide electronic devices with improved wireless charging capabilities.

SUMMARY

An electronic device may contain an input-output device such as a speaker, vibrator, or near field communications antenna. The input-output device may include an inductor. For example, a speaker may include an inductor called a voice coil that is coupled to a speaker diaphragm. The speaker may contain travel-limiting stop structures. When the speaker is overdriven using vibrator control signals, the voice coil will strike the travel-limiting stop structures. In this mode of operation, the speaker may be operated as a vibrator. In configurations in which the inductor serves as a near field communications antenna, the inductor may be used in transmitting and receiving near field communications signals.

The inductor in the input-output device may be shared by wireless charging circuitry in the electronic device so that wireless charging signals can be converted into power to charge a battery in the electronic device. The wireless charging circuitry may include a capacitor to help convert alternating current wireless charging signals into direct current signals for charging the battery and powering circuitry in the electronic device. Switching circuitry in the wireless charging circuitry can selectively couple the capacitor to the inductor when wireless charging signals are being received and converted into power in the electronic device and can selectively isolate the inductor from the capacitor when it is desired to use the inductor as part of a speaker, vibrator, or near field communications circuit.

If desired, a separate inductor that is co-located with the input-output device inductor may be provided to support wireless charging. With this type of configuration, the drive circuit may supply drive signals to the inductor of the input-output device such as audio signals, vibrator control signals, or near field communications output signals for a hearing aid or other external near field communications equipment. An input amplifier that is coupled across the inductor in the input-output device may be used in receiving near field communications signals. When it is desired to receive wireless charging signals, the wireless charging signals may be received using the separate inductor.

Further features, their nature and various advantages will be more apparent from the accompanying drawings and the following detailed description of the preferred embodiments.

DETAILED DESCRIPTION

Figure 1:
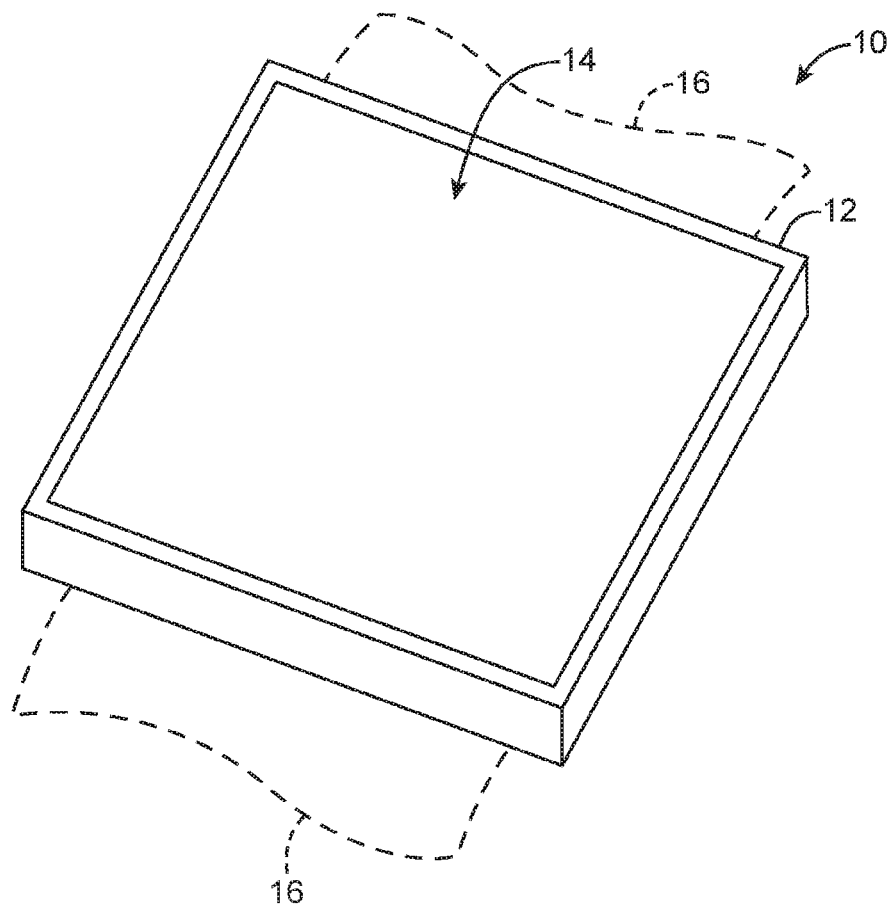
FIG. 1 is a perspective view of an illustrative electronic device of the type that may be provided with wireless charging capabilities in accordance with an embodiment.

An illustrative electronic device that may be provided with wireless charging capabilities is shown in FIG. 1. Electronic devices such as device 10 of FIG. 1 may be cellular telephones, media players, other handheld portable devices, somewhat smaller portable devices such as wristwatch devices, pendant devices, or other wearable or miniature devices, gaming equipment, tablet computers, notebook computers, desktop computers, televisions, computer monitors, computers integrated into computer displays, or other electronic equipment. As an example, device 10 may be a small portable device such as a wristwatch device that is attached to the wrist of a user with optional strap 16. Configurations for device 10 in which device 10 is a wristwatch device or other compact portable device benefit from the inclusion of compact wireless charging circuitry but wireless charging circuitry may be provided in other types of electronic device if desired.

In the configuration of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass or clear plastic. Openings may be formed in the display cover layer and in housing 12 to accommodate buttons, speaker ports, data ports, audio jack connectors, and other components.

Figure 2:
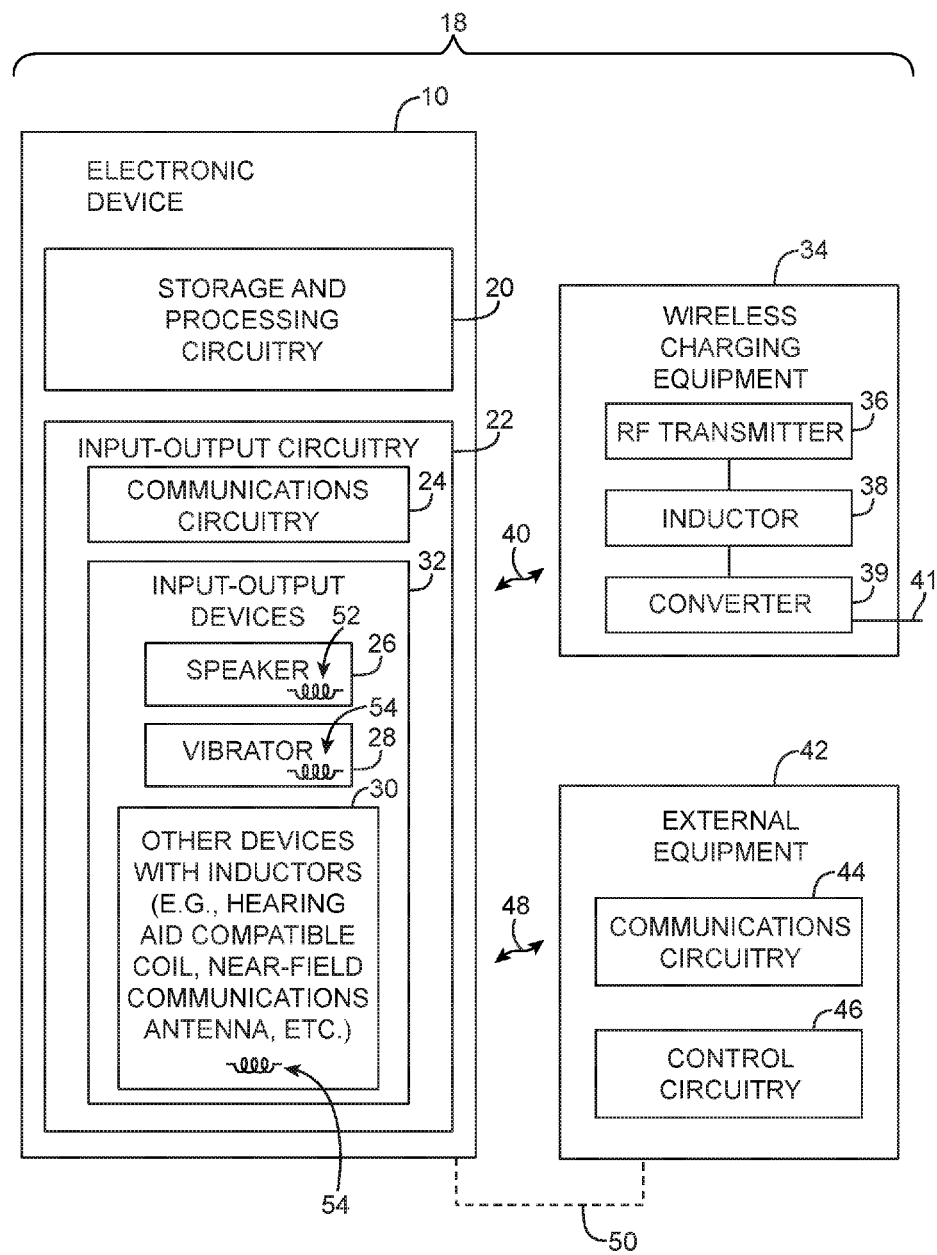
FIG. 2 is a schematic view of an illustrative electronic device of the type that may be provided with wireless charging capabilities and associated external equipment in accordance with an embodiment.

A schematic diagram of device 10 and associated external equipment is shown in FIG. 2. In system 18 of FIG. 2, device 10 may receive wireless power from wireless charging equipment 34 in the form of wireless radio-frequency signals 40. Tuned circuitry within device 10 may receive radio-frequency signals 40 and may convert the alternating current (AC) power associated with the received radio-frequency signals into direct current (DC) power for powering electronic device 10.

Device 10 may use wireless paths such as a wireless path associated with wireless signals 48 and wired paths such as optional path 50 to communicate with external equipment 42. External equipment 42 may include one or more devices such computers or other computing equipment. For example, external equipment 42 may include one or more cellular telephones, media players, other handheld portable devices, somewhat smaller portable devices such as wristwatch devices, pendant devices, or other wearable or miniature devices, gaming equipment, tablet computers, notebook computers, desktop computers, televisions, computer monitors, computers integrated into computer displays, a hearing aid, a near field communications point of sale terminal for handling wireless payments, a near field communications reader associated with security equipment (e.g., a door opener, a badge reader, etc.), other near field communications equipment, or other external equipment.

Wireless communications paths such as the wireless communications path associated with wireless signals 48 may support wireless communications such as near field communications, cellular telephone communications, wireless local area network communications, etc. As an example, device 10 may sometimes use wireless signals 48 and near field communications to communicate with one type of near field communications equipment and may, at other times, communicate with one or more other types of near field communications equipment. For example, a user of device 10 may place device 10 near to a point of sale terminal when it is desired to make a wireless payment using near field communications, may place device 10 near a door lock when it is desired to obtain access to a building using near field communications, may place device 10 near a security card reader when it is desired to authenticate to a computer system using near field communications, and may place device 10 near to a hearing aid when it is desired to communicate with the hearing aid using near field communications. A near field communications antenna in device 10 may be used to support near field communications. Device 10 may use antennas and radio-frequency transceiver circuitry to communicate with cellular telephone towers and other cellular telephone network equipment, wireless local area network wireless equipment, peer devices, computing equipment, and other external equipment 42.

External equipment 42 may include control circuitry 46 and communications circuitry 44. Control circuitry 46 may include one or more integrated circuits such as processors, memory circuits, and application-specific integrated circuits. Communications circuitry 44 may include circuitry for supporting wired and wireless communications. For example, communications circuitry 44 may include serial and parallel digital communications circuits for handling communications over wired path 50. Communications circuitry 44 may also include antenna structures and radio-frequency transceiver circuitry for handling wireless communications with device 10 (e.g., for transmitting and receiving wireless signals 48).

Wireless charging equipment 34 may receive power from sources such as AC input 41. Power supply circuitry such as converter 39 may be used to convert AC input power on input 41 to DC power for powering the circuitry of wireless charging equipment 34. During operation, wireless charging equipment 34 may use radio-frequency circuitry such as radio-frequency transmitter 36 to generate radio-frequency signals 40 that are wirelessly transmitted to device 10 using inductor circuitry such as inductor 38. Device 10 can receive the transmitted radio-frequency signals 40 using inductor circuitry based on one or more inductors 52 and can convert these received signals into power for device 10. For example, system 18 may use resonant inductive coupling (near field electromagnetic coupling) between inductor 38 and a corresponding inductor 52 in device 10 to transfer power from wireless charging equipment 34 and device 10. An illustrative frequency for transmitted RF energy using signals 40 is 200 kHz. Other frequencies may be used, if desired (e.g., frequencies in the kHz range, the MHz range, or in the GHz range, frequencies of 1 kHz to 1 MHz, frequencies of 1 kHz to 100 MHz, etc.).

Electronic device 10 may include control circuitry such as storage and processing circuitry 20. Control circuitry 20 may include microprocessors, microcontrollers, digital signal processors, application-specific integrated circuits, storage such as volatile and non-volatile memory (e.g., hard drives, solid state drives, random-access memory, etc.), and other storage and processing circuitry.

Input-output circuitry 22 may be used in supplying output to users of device 10 and external equipment and may be used in receiving input from users and external equipment. Input-output circuitry 22 may include communications circuitry 24 and input-output devices 32.

Device 10 may use communications circuitry 24 for communicating with communications circuitry 44 of external equipment 42 over wired path 50 and using wireless signals 48 over a corresponding wireless path. Communications circuitry 24 and 44 may include one or more radio-frequency transmitters, one or more radio-frequency receivers, both transmitters and receivers, or other suitable communications circuitry for generating radio-frequency signals for wired and wireless communications. With one illustrative arrangement, device 10 includes a transmitter (i.e., communications circuitry 24 may include a transmitter) and equipment 42 includes a corresponding receiver (i.e., communications circuitry 44 includes a receiver). This type of arrangement may be used to support unidirectional wireless communications between device 10 and external equipment 42.

If desired, bidirectional wireless communications may be supported. For example, communications circuitry 44 may include a transmitter and a receiver and communications circuitry 24 may include a corresponding transmitter and a receiver.

Antenna structures may be provided in electronic device 10 and external equipment 42 for supporting near field communications and other wireless communications. The antenna structures may include near field coupled inductors. Wireless communications signals 48 that are transmitted using a wireless path may, in general, be communicated from device 10 to equipment 42, from equipment 42 to device 10, or both from device 10 to equipment 42 and from equipment 42 to device 10. Wireless signals 40 may be used to transmit power from wireless charging equipment 34 to device 10 and may, if desired, be used in transferring unidirectional or bidirectional data between device 10 and equipment 34.

Input-output circuitry 22 may include input-output devices 32 such as buttons, joysticks, click wheels, scrolling wheels, a touch screen such as display 14 of FIG. 1, other touch sensors such as track pads or touch-sensor-based buttons, vibrators such as vibrator 28, audio components such as microphones and speakers such as speaker 26, image capture devices such as a camera module having an image sensor and a corresponding lens system, keyboards, status-indicator lights, tone generators, key pads, and other equipment for gathering input from a user or other external source and/or generating output for a user.

As shown in FIG. 2, components such as audio transducers (e.g., illustrative speaker 26 and vibrator 28 of FIG. 2) may include inductor circuitry such as one or more inductors 52. For example, speaker 26, which may serve as an audio speaker or both as an audio speaker and as a vibrator, may have an inductor of the type that is sometimes referred to as a voice coil. The inductor is driven with signals that cause a diaphragm to move, thereby producing sound. As another example, vibrator 28 may have a weight (e.g., a rotationally asymmetric weight) that is driven by a motor with a rotating shaft. The motor may have one or more inductors such as inductor 54 of vibrator 28 of FIG. 2.

If desired, additional circuitry in device 10 such as other devices 30 may have one or more inductors. Examples of other devices that may include inductor circuitry include communications circuits such as near field communications antennas and other wireless communications components for communicating with external equipment 42 such as a hearing aid or other near field communications equipment. Near field communications may involve inductively coupled near field communications in which both the transmitter and receiver have associated inductors that are electromagnetically coupled (as shown schematically by wireless signals 48 of FIG. 2).

Inductors 52 consume space within electronic device 10. To minimize the amount of space consumed by the inductor circuitry used for supporting wireless charging with wireless charging equipment 34 and the inductor circuitry used in input-output devices 32, device 10 can use shared and/or co-located inductor configurations. For example, device 10 may have an inductor that is shared between an input-output device such as a speaker (or other input-output device) and a wireless charging circuit. By using the inductor for dual purposes (both as part of a tuned inductor circuit that receives wireless power and as part of an audio transducer in this example), duplication of resources and the size of device 10 can be minimized.

Figure 3:
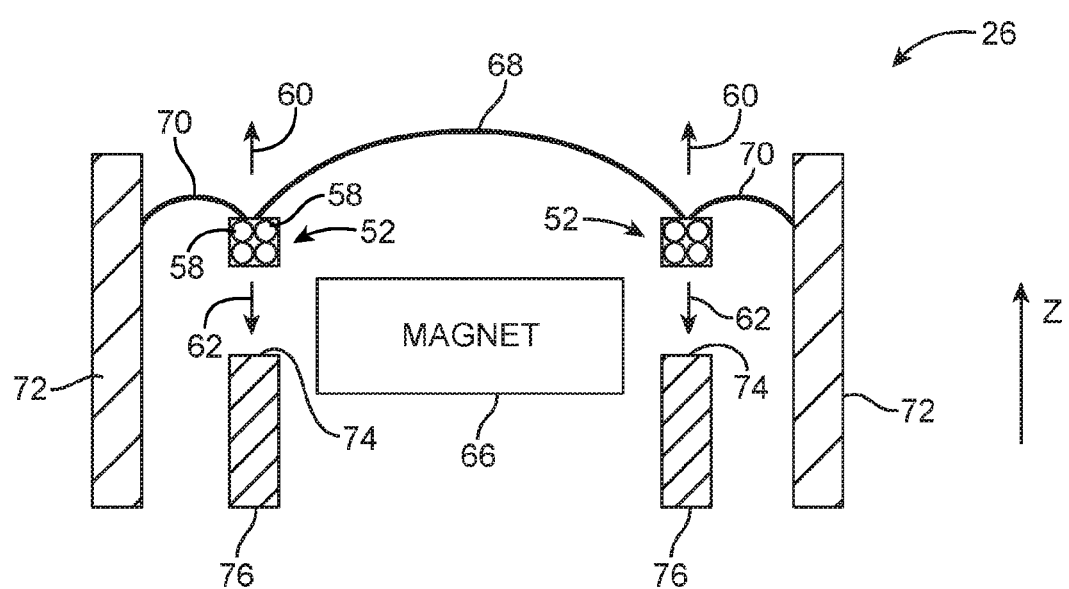
FIG. 3 is a cross-sectional side view of an audio transducer such as a speaker in accordance with an embodiment.

FIG. 3 is a cross-sectional view of an illustrative input-output device 32 such as a speaker. As shown in FIG. 3, device (speaker) 26 includes inductor 52. Inductor 52 may be used in operating speaker 26 to produce sound and may be used in receiving wireless power from wireless charging equipment 34. In the FIG. 3 example, the input-output device that is illustrated is a speaker. In general, however, inductor 52 may be incorporated into vibrator 28 or other input-output devices 30 such as near field communications antennas and other components, etc. Configurations in which inductor 52 is incorporated into speaker 26 may sometimes be described herein as an example.

Inductor 52, which may sometimes be referred to as a speaker voice coil, speaker coil, or voice coil, may contain one or more turns of wire 58. Speaker 26 may use a moving coil design or a moving magnet design. In the illustrative configuration of FIG. 3, speaker 26 has a moving coil design in which inductor 52 moves in upwards direction 60 and downwards direction 62 relative to stationary magnet 66. Diaphragm 68 is connected to inductor 52, so movement of inductor 52 causes corresponding movement in diaphragm 68. Inductor 52 may have a circular outline (when viewed in direction Z) and speaker 26 may have a corresponding circular shape. Support structures 72 may surround the periphery of speaker 26 of speaker. Surround 70 couples inductor (coil) 52 to support structures 72. Diaphragm 68 may have a circular shape that fills the center of inductor (coil) 52.

Internal speaker support structures 76 may serve as travel-limiting stop structures for inductor 52 and speaker 26. When driven with drive signals of sufficiently low magnitude, coil 52 will not contact surfaces 74 of travel-limiting stop structures 76. In this type of low-magnitude speaker mode of operation, speaker 26 can produce audio output in response to the drive signal. When driven with drive signals of sufficiently large magnitude (sometimes referred to as overdrive signals in an overdriven mode of operation), coil 52 will contact surfaces 74 when driven downwards in direction 62. The contact between coil 52 and surfaces 74 of travel-limiting stop structures 76 will limit the maximum downwards travel of speaker coil 52. In overdriven mode of operation, speaker 26 can operate as a vibrator that creates a buzzing sound and a noticeable physical vibration that can be felt by a user holding device 10. During operation of device 10, speaker 26 may be supplied with a low magnitude audio drive signal so that speaker 26 can be used to produce audio output in connection with playing media or supplying sound for a voice telephone call or speaker 26 may be supplied with an overdriven vibrator control signal so that speaker 26 can serve as a vibrator to alert a user to incoming telephone calls, alarm events, and other events for which a more silent mode of providing output for the user is desired.

Figure 4:
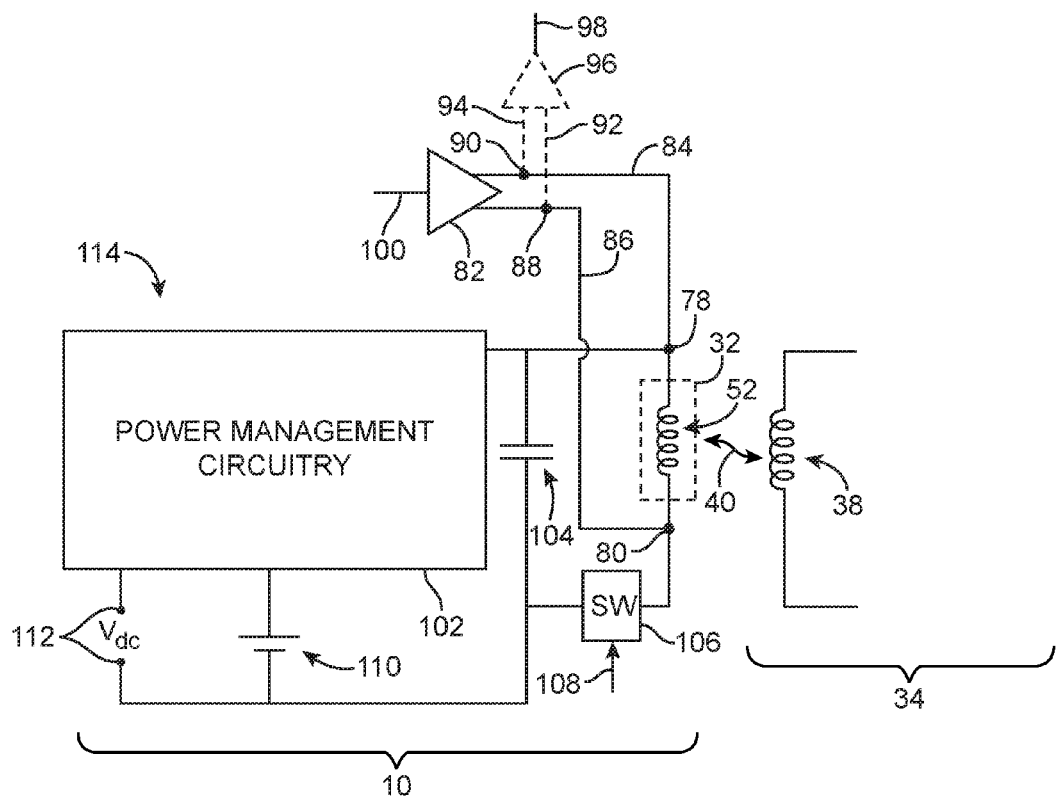
FIG. 4 is a circuit diagram of an electronic device having an input-output device such as an electroacoustic transducer, near field communications antenna, or other electronic component with an inductor of the type that may be used in supporting wireless charging in accordance with an embodiment.

To support wireless charging operations, coil 52 can serve as the inductor in an inductively coupled wireless power transfer circuit. FIG. 4 is a circuit diagram of illustrative circuitry for device 10 showing how inductor 52 may be used both as a portion of an input-output device such as a speaker, vibrator, or near-field communications antenna and as a portion of wireless charging circuit for charging battery 110 from wireless signals 40.

As shown in FIG. 4, inductor 52 may be coupled between terminals 78 and 80. Terminals 78 and 80 may be coupled to wireless charging circuitry 114 such as power management circuitry 102 and capacitor 104. Power management circuitry 102 may be used in converting alternating current power received by inductor 52 from inductor 38 of wireless charging equipment 34 in the form of wireless signals 40 to DC power. Capacitor 104 may be used as a charge storage element that helps in converting received radio-frequency (alternating current) signals 40 to direct current (DC) power. Power management circuitry 102 may also be used in routing DC power from capacitor 104 to battery 110 to charge battery 110 may be used in routing DC power to power supply terminals 112. The power supply voltage (e.g., voltage Vdc in the FIG. 4 example) that is produced across terminals 112 may be used in powering control circuitry 20 and input-output circuitry 22 of device 10. When wireless power is not available from wireless power signals 40, power may be supplied to control circuitry 20 and input-output circuitry 22 from battery 110.

Switch 106 may be controlled by control circuitry 20 using input on control line 108. When it is desired to use the circuitry of FIG. 4 in wireless charging mode, switch 106 may be placed in a closed state to couple capacitor 104 across terminals 78 and 80 of inductor 52 and connecting inductor 52 to wireless charging circuit 114. When it is desired to drive signals through inductor 52 (i.e., when using the input-output device 32 in which inductor 52 is contained), a control signal may be supplied to control line 108 that places switch 106 in an open state, thereby decoupling capacitor 104 and wireless charging circuit 114 from inductor 54.

Inductor 52 may be a voice coil, part of a motor in a vibrator, a near field communications antenna, or other structure in input-output device 32. Input-output device 32 may be a speaker, vibrator, a near-field communications inductor circuit such as a near field communications antenna circuit coupled to near field communications circuitry 24 for transmitting near field communications signals 48 to a hearing aid or other external equipment 42, or other component in device 10 that contains inductor 52.

Drive signals for the speaker, vibrator, or near-field communications circuit may be supplied using an output driver (sometimes referred to as an output amplifier, output buffer, or output circuit) such as output driver 82 of FIG. 4. As shown in FIG. 4, driver 82 may have input 100 for receiving input signals. Driver 82 may use input 100 as an input path to receive input from circuitry in device 10 such as communications circuitry 24 and/or control circuitry 20. The input signals that re received on input 100 may be audio input signals, vibrator control signals, data that is being transmitted to a hearing aid or other external equipment via near field communications, etc. Based on the input received at input 100, driver 82 may produce output drive signals across terminals 78 and 80 using signal lines 84 and 86, respectively.

The type of signals that are provided on output lines 84 and 86 depends on the nature of device 32. In configurations in which device 32 is a speaker, the signals that are provided to lines 84 and 86 and that are driven through inductor 52 will be audio signals (i.e., inductor 52 will operate as a speaker voice coil). In configurations in which device 32 is a speaker that operates both as a speaker and (when overdriven) as a vibrator, the signals on lines 84 and 86 will be audio signals for operating device 32 in speaker mode or vibrator control signals for operating device 32 in vibrator mode. In configurations in which device 32 is a near field communications component (e.g., a near-field communications antenna formed by inductor 52), the signals on lines 84 and 86 will be hearing aid signals or other near field communications signals (see, e.g., wireless signals 48 of FIG. 2).

The circuitry of FIG. 4 therefore allows inductor 52 to be shared between multiple functions. When it is desired to receive wireless power in device 10 from wireless charging equipment 34, switch 106 is closed and inductor 52 serves as a near field coupled inductive antenna that is coupled to inductor 38 through near field electromagnetic coupling, allowing wireless power to be transferred from wireless charging equipment 34 to device 10 via wireless signals 40. Power management circuitry 102 may be used to deliver this received wireless power to the load across terminals 112 (i.e., the circuitry of device 10) and/or battery 110. When it is desired to use inductor 52 as part of input-output device 32 (e.g., as a speaker, vibrator, or near field communications antenna for transmitting signals 48 to external equipment 42 of FIG. 2), switch 106 is opened and signals are provided to inductor 52 from driver 82.

If desired, signals such as near field communications signals from a hearing aid or other external equipment 42 may be received by inductor 52 (e.g., when inductor 52 is being used to form a near field communications antenna that receives data in the form of wireless signals 48). In this type of scenario, paths 84 and 86 may supply the received signals from inductor 52 to terminals 90 and 88, respectively. Respective input lines 94 and 92 of input amplifier 96 may drive the received signals onto path 98. Path 98 may be used to provide data corresponding to the received signals 48 to circuitry in device 10 such as communications circuitry 24 and control circuitry 20. During the process of receiving near field communications data via inductor 52, switch 106 may be opened to isolate inductor 52 from capacitor 104 and wireless charging circuitry 114.

Figure 5:
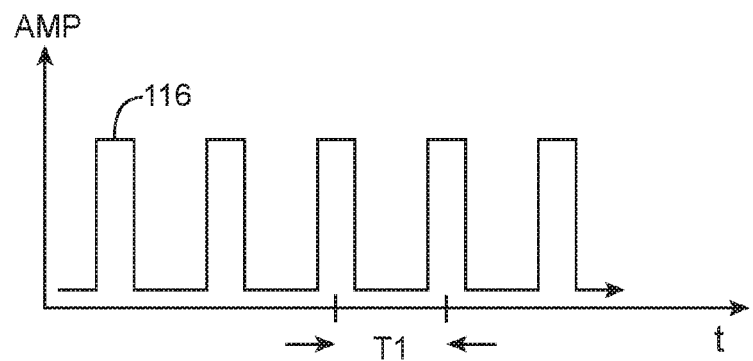
FIGS. 5 and 6 are graphs showing illustrative drive signals that may be applied to an electronic component such as an electroacoustic transducer in an electronic device with wireless charging capabilities in accordance with an embodiment.

FIG. 5 is a graph showing illustrative control signals that may be provided to a speaker such as speaker 26 when operated in a vibrator mode. In particular, trace 116 of FIG. 5 corresponds to signals that may be driven by driver 82 across a voice coil in speaker 26 such as inductor 52 of FIG. 4. As shown in FIG. 5, trace 116 may be a square wave with a fixed amplitude (AMP) and a period of T1. The period T1 may be selected so that trace 116 exhibits a frequency of about 20-500 Hz (as an example). The peak magnitude of trace 116 may be selected so as to overdrive a voice coil in speaker 26 (i.e., so that inductor 52 strikes travel-limiting structures 76 of FIG. 3). Drive signals such as the drive signal of FIG. 5 may also be used in operating vibrators with inductor circuitry such as inductor (i.e., vibrator devices such as motors with asymmetric weights that do not serve dual functions as both vibrators and speakers).

Figure 6:
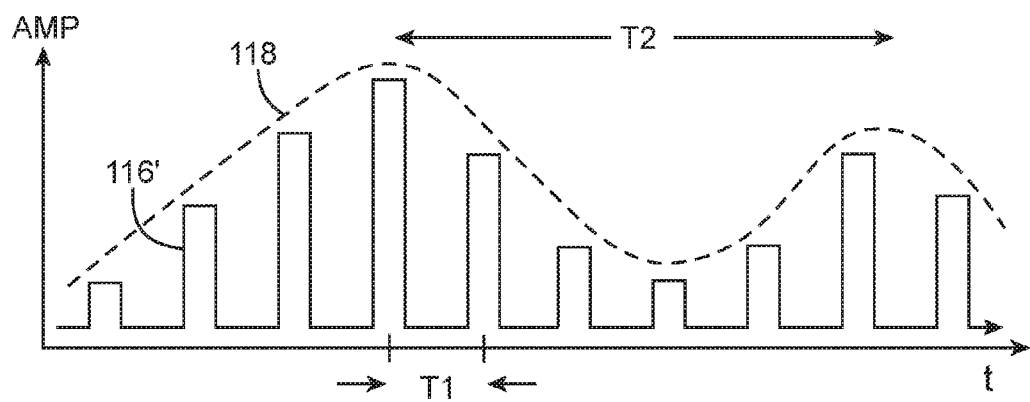

FIG. 6 shows how a vibrator control signal for a vibrator or for a speaker operating in a vibrator mode may take the form of a square wave 116' of period T1. Drive signal 116' has an amplitude that is bounded by envelope 118. Envelope 118 may have a frequency that is lower than the frequency of drive signal 116'. Envelope 118 may have a square wave shape, a sinusoidal shape (as in the example of FIG. 6), a triangular shape, or other shape. The period T2 of envelope 118 may be in the range of 0.1 s to 1 s (as an example). When device 10 applies the drive signal of FIG. 6 to inductor 52, the speaker or vibrator in device 10 may exhibit a periodic buzzing behavior to alert a user of the occurrence of an incoming message, telephone call, or other event.

Figure 7:
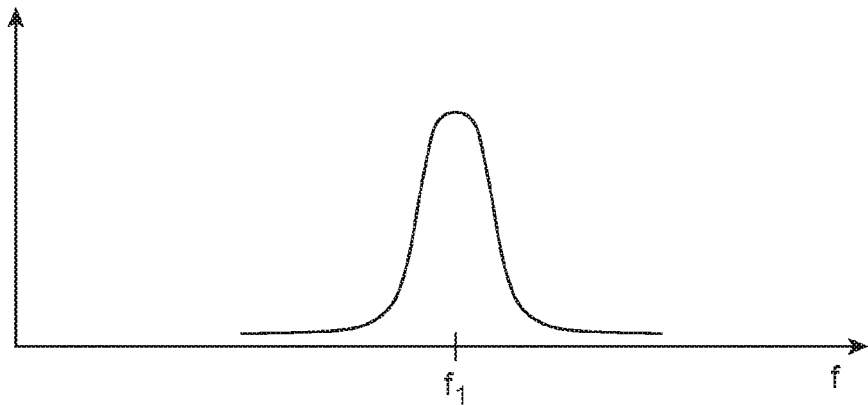
FIG. 7 is a graph in which characteristics of an electroacoustic transducer have been plotted as a function of operating frequency in an electronic device in accordance with an embodiment.
Figure 7:
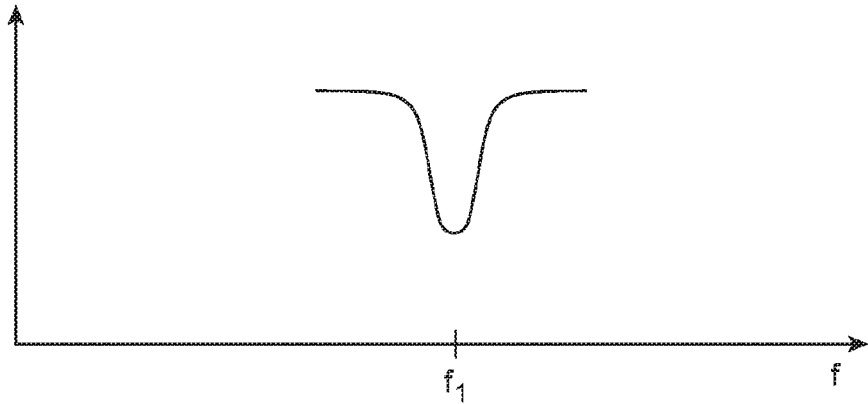
Figure 7:
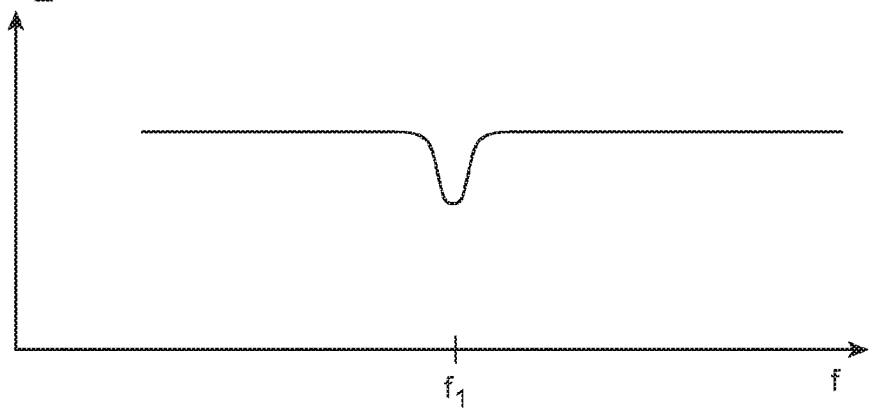

In configurations in which it is desired to operate speaker 26 in a vibrator mode, speaker 26 may exhibit a resonance at a resonant frequency (f1), as illustrated in the upper trace of FIG. 7 in which speaker amplitude has been plotted as a function of operating frequency f. The presence of the resonance at frequency f1 may allow speaker 26 to be overdriven using vibrator control signals of the type shown in FIGS. 5 and 6 so that the speaker functions as a vibrator. Due to the presence of the f1 resonance, speaker 26 may exhibit an impedance R of the type plotted in the middle trace of FIG. 7 (i.e., speaker 26 may exhibit a dip in impedance at resonance frequency f1). When speaker 26 is operated in speaker mode, it may be desirable to equalize the audio signals that are being used to drive inductor (voice coil) 52 in speaker 26 by incorporating an equalization curve such as curve AUDIO_EQ into the output performance of driver 82 (e.g., by incorporating filter circuitry into driver 82). Use of this type of equalization curve, which exhibits a drop in transmission at frequency f1, compensates for the lowered impedance R of speaker 26 at frequency f1, thereby ensuring that audio playback is characterized by a flat frequency response.

Figure 8:
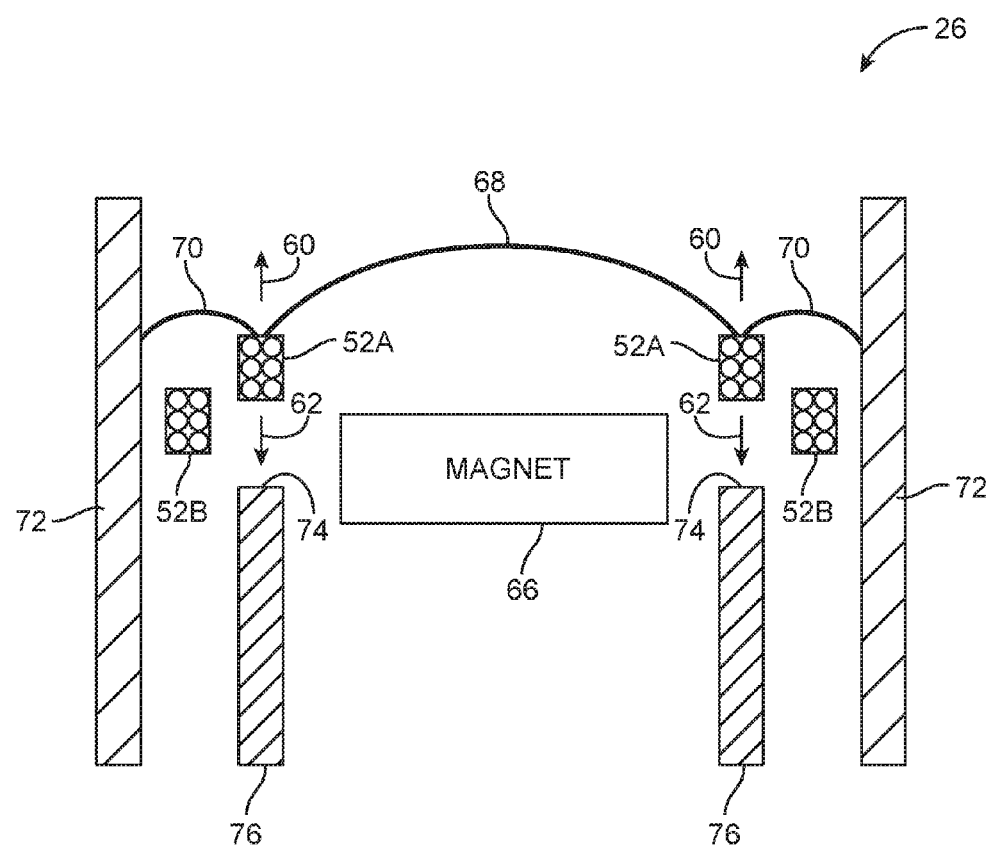
FIG. 8 is a cross-sectional side view of an audio transducer such as a speaker that has been provided with an ancillary co-located inductor coil to handle wireless charging functions in accordance with an embodiment.

If desired, the wireless charging inductor in device 10 may be separate from the inductor used in input-output device 32. For example, a first inductor may be used for receiving wireless charging signals 40 and a second inductor may be used as part of input-output device 32 (e.g., as a voice coil in a speaker, as an inductive element in a vibrator, as a near field communications antenna for communicating wirelessly via signals 48 with external equipment 42, etc.). FIG. 8 is a cross-sectional side view of an illustrative input-output device 32 such as speaker 26 (or a vibrator, near field communications antenna or other device) showing how the first and second inductors may be co-located. In the FIG. 8 example, speaker 26 has a first inductor such as voice coil inductor 52A for driving diaphragm 68 to produce sound (or to operate speaker 26 in vibrator mode by overdriving coil 52A until coil 52A strikes travel-limiting surfaces 74 of travel-limiting stop structures 76) and has a second inductor such as inductor 52B for serving as a wireless charging inductor that receives wireless signals 40 from inductor 38 in wireless charging equipment 34.

Inductors 52A and 52B are both located within the same input-output device 32 (speaker 26 in the FIG. 8 example), so inductors 52A and 52B may sometimes be referred to as being co-located inductors. Inductors 52A and 52B may be coils that are wound on a common support structure, may be concentric coils mounted on separate support structures, or may otherwise be integrated into a common input-output device 32 such as speaker 26. There is generally space available within devices such as speaker 26 in which to mount inductors such as separate wireless charging inductor 52B, so the use of a co-located mounting arrangement for mounting the first and second inductors can save space within device 10.

Figure 9:
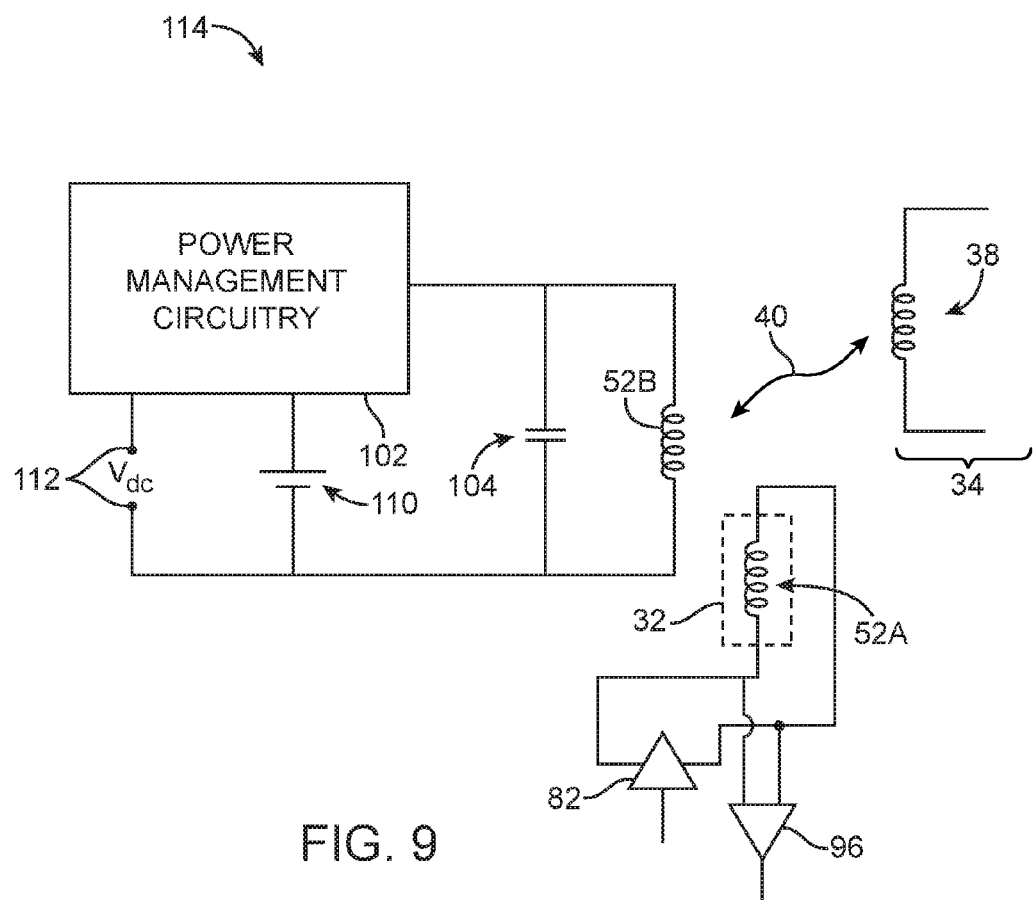
FIG. 9 is a circuit diagram of an electronic device having an input-output device such as an electroacoustic transducer and an ancillary inductor coil for handling wireless charging functions in accordance with an embodiment.

FIG. 9 is a circuit diagram of device 10 in a configuration in which separate inductors 52A and 52B such as co-located inductors are being used in speaker 26 or other input-output device 32 of FIG. 8 or other separate inductor structures. As shown in FIG. 9, inductor 52B forms part of wireless charging circuitry 114. Terminals 78B and 80B in wireless charging circuitry 114 may be coupled to circuitry such as power management circuitry 102 and capacitor 104. During wireless power transfer operations, wireless charging circuitry such as power management circuitry 102 may be used in converting alternating current power received by inductor 52B from inductor 38 of wireless charging equipment 34 in the form of wireless signals 40 to DC power. Capacitor 104 helps in converting received radio-frequency (alternating current) signals 40 to DC power. Power management circuitry 102 may route DC power from across capacitor 104 to battery 110 to charge battery 110 and/or power management circuitry 102 may route DC power to power supply terminals 112 to power the circuitry of device 10. The power supply voltage Vdc of FIG. 9 may, for example, be used in powering control circuitry 20 and input-output circuitry 22 of device 10. When wireless power is not available from wireless power signals 40, power may be supplied to control circuitry 20 and input-output circuitry 22 of device 10 from battery 110.

Terminals 78A and 80A of inductor 52A are not shorted across terminals 78B and 80B because inductor 52A is separate from inductor 52B in the configuration of FIG. 9. As a result, switch 106 of FIG. 4 may, if desired, be omitted from circuitry 114 of FIG. 9. As shown in FIG. 9, inductor 52A may form part of input-output device 32. Input-output device 32 of FIG. 9 may be a speaker, may be a vibrator, may be a near field communications inductor circuit such as a near field communications antenna for transmitting near field communications signals 48 to a hearing aid or other external equipment 42 and for receiving incoming near field communications signals 48, or may be another component in device 10 that contains inductor 52A.

Drive signals for the speaker, vibrator, or near-field communications circuit may be supplied across terminals 78A and 80A using an output driver such as output driver 82. As shown in FIG. 9, driver 82 may have input 100 for receiving input signals. Input from circuitry in device 10 such as communications circuitry 24 and/or control circuitry 20 may be supplied to driver circuit 82 using input 100. The input that is received on path 100 may be audio input, vibrator control signals, data that is being transmitted to a hearing aid or other external equipment via near field communications, or other signals. Based on the input received at input path 100, driver 82 may produce drive signals across terminals 78A and 80A using signal lines 84 and 86, respectively.

In configurations in which device 32 is a speaker, the signals that are provided to inductor 52A using lines 84 and 86 will be audio signals (i.e., inductor 52A will be a speaker voice coil such as a voice coil co-located with wireless charging inductor 52B). In configurations in which device 32 is a speaker that operates both as a speaker and as a vibrator (depending on whether or not the speaker is driven using audio signals or is overdriven using vibrator control signals), the signals on lines 84 and 86 will be audio signals for operating device 32 in speaker mode or vibrator control signals for operating device 32 in vibrator mode. In configurations in which device 32 is a near field communications component (e.g., a near-field communications antenna formed from inductor 52A), the signals on lines 84 and 86 will be hearing aid signals or other near field communications signals for wirelessly transmitting to external equipment 42.

As with the shared inductor configuration of FIG. 4, the separate inductor configuration of FIG. 9 allows device 10 to perform multiple functions. When it is desired to receive wireless power in device 10 from wireless charging equipment 34, inductor 52B in wireless charging circuit 114 can receive wireless power from wireless charging equipment 34 in the form of wireless signals 40. Power management circuitry 102 may then be used to deliver this received wireless power to the load across terminals 112 and/or battery 110. When it is desired to use input-output device 32 (e.g., as a speaker, vibrator, or near field communications antenna for transmitting signals 48 to external equipment 42 of FIG. 2), signals can be provided to inductor 52A from driver 82. If desired, inductors 52A and 52B may be operated simultaneously.

Signals such as near field communications signals from a hearing aid or other external equipment 42 may be received by inductor 52A when inductor 52A is being used to form a near field communications antenna that receives data in the form of wireless signals 48. In this configuration, the received signals from inductor 52A are routed to the inputs of input amplifier 96. Input-amplifier 96 may provide the received near field communications data received on its inputs to path 98. Path 98 may then be used to provide data corresponding to the received signals 48 to circuitry in device 10 such as communications circuitry 24 and control circuitry 20. Because inductor 52A is separate from inductor 52B in the arrangement of FIG. 9, it is not necessary to use an inductor isolation switch such as switch 106 of FIG. 4 to isolate inductor 52A from capacitor 104 during signal reception operations with input amplifier 96.

Inductors such as inductors 52, 52A, 52B and other inductive circuitry in device 10 may be formed from one or more coils of wire, may be formed from structures that are formed within components of device 10 such as input-output devices 32 (e.g., within a speaker housing or other speaker structures, within a vibrator housing or other vibrator structures, within a near field communications antenna structure or other near field communications structures, etc.).

The foregoing is merely illustrative and various modifications can be made by those skilled in the art without departing from the scope and spirit of the described embodiments. The foregoing embodiments may be implemented individually or in any combination.

What is claimed is:

1. A wearable electronic device, comprising:
   a housing having first and second sides, wherein the first side is coupled to a first end of a strap and the second side is coupled to a second end of the strap;
   a touch screen display in the housing, wherein the touch screen display comprises at least one force-based component;
   circuitry in the housing that is driven to produce a physical vibration that serves as an alert for an event;
   wireless communications circuitry in the housing that is configured to wirelessly communicate with a portable wireless electronic device;
   a battery that powers the light-emitting component, the circuitry, and the wireless communications circuitry; and
   wireless charging circuitry that charges the battery using received wireless charging signals.

2. The wearable electronic device defined in claim 1, further comprising:
   near field communications circuitry in the housing that is configured to receive near field communications signals from external equipment.

3. The wearable electronic device defined in claim 1, further comprising:
   a button in the housing, wherein the button is separate from the touch screen display.

4. The wearable electronic device defined in claim 1, further comprising:
   a speaker in the housing.

5. The wearable electronic device defined in claim 1, further comprising:
   a microphone in the housing.

6. The wearable electronic device defined in claim 1, further comprising:
   wireless local area network transceiver circuitry.

7. The wearable electronic device defined in claim 1, wherein the wireless communications circuitry is configured to wirelessly communicate with a cellular telephone.

8. A wearable electronic device, comprising:
   a housing having first and second sides, wherein the first side is coupled to a first end of a wrist strap and the second side is coupled to a second end of the wrist strap;
   near field communications circuitry within the housing, wherein the near field communications circuitry is configured to authenticate the wearable electronic device to external security equipment using near field communications signals;
   circuitry within the housing that is configured to generate a physical vibration alert;
   a touch screen display in the housing; and
   a button in the housing that is separate from the touch screen display.

9. The wearable electronic device defined in claim 8, wherein the near field communications circuitry is configured to obtain access to a building using the near field communications signals.

10. The wearable electronic device defined in claim 8, wherein the near field communications circuitry is configured to wirelessly communicate with a door opener using the near field communications signals.

11. The wearable electronic device defined in claim 8, wherein the near field communications circuitry is configured to wirelessly communicate with a badge reader using the near field communications signals.

12. The wearable electronic device defined in claim 8, wherein the near field communications circuitry is configured to make wireless payments with point of sale equipment using the near field communications signals.

13. The wearable electronic device defined in claim 8, wherein the near field communications circuitry is configured to authenticate the wearable electronic device to a desktop computer using the near field communications signals.

14. The wearable electronic device defined in claim 8, further comprising:
    status indicator lights in the housing.

15. A wristwatch device, comprising:
    a battery;
    wireless charging circuitry configured to charge the battery using wireless charging signals received from external equipment;
    near field communications circuitry that handles near field communications signals;
    a wireless local area network transceiver that is powered by the battery;
    circuitry that is driven to produce a physical vibration that serves as an alert for an event;
    a touch screen display that is powered by the battery; and
    a button that is separate from the touch screen display.

16. The wristwatch device defined in claim 15, further comprising:
    a housing, wherein the housing has opposing first side and second sides, the first side is coupled to a first end of a wrist strap, and the second side is coupled to a second end of the wrist strap.

17. The wristwatch device defined in claim 16, further comprising:
    wireless communications circuitry that is powered by the battery and that communicates with a cellular telephone.

18. The wristwatch device defined in claim 17, further comprising:
   a speaker that is powered by the battery.

19. The wristwatch device defined in claim 18, further comprising:
   a microphone that is powered by the battery.

20. The wristwatch device defined in claim 19, wherein the near field communications circuitry is configured to make wireless payments with point of sale equipment using the near field communications signals.

21. The wristwatch device defined in claim 20, further comprising:
   an inductor, wherein the near field communications circuitry is configured to receive the near field communications signals using the inductor and the wireless charging circuitry is configured to receive the wireless charging signals using the inductor.

* * * * *